United States Patent [19]
Beer et al.

[11] Patent Number: 5,941,137
[45] Date of Patent: Aug. 24, 1999

[54] CONTROLLER FOR A MOTOR VEHICLE WITH AN AUTOMATIC TRANSMISSION

[75] Inventors: Stefan Beer, Laaber; Klaus Staerker, Neutraubling, both of Germany

[73] Assignee: Siemens Aktiengesellschaft, Munich, Germany

[21] Appl. No.: 09/042,449

[22] Filed: Mar. 16, 1998

Related U.S. Application Data

[63] Continuation-in-part of application No. 08/700,687, Aug. 12, 1996, abandoned.

[30] Foreign Application Priority Data

Aug. 11, 1995 [DE] Germany .......................... 195 29 665

[51] Int. Cl.⁶ .............................. F16H 57/02; F16K 31/02
[52] U.S. Cl. ...................... 74/606 R; 174/52.2; 137/884
[58] Field of Search .................................. 74/606 R, 335; 137/884, 270, 596.17, 883, 238; 174/52.2

[56] References Cited

U.S. PATENT DOCUMENTS

| | | | |
|---|---|---|---|
| 4,678,006 | 7/1987 | Northman et al. | 137/596.17 |
| 4,784,019 | 11/1988 | Morscheck . | |
| 4,805,490 | 2/1989 | Fuehrer et al. | 74/606 R X |
| 4,842,021 | 6/1989 | Stoll | 137/884 |
| 4,899,607 | 2/1990 | Stainton | 74/473 R X |
| 5,109,721 | 5/1992 | Boardman et al. | 74/336 R |
| 5,109,729 | 5/1992 | Boardman | 74/858 |
| 5,259,271 | 11/1993 | Martin et al. | 74/606 R |
| 5,361,650 | 11/1994 | Klecker et al. . | |
| 5,611,372 | 3/1997 | Bauer et al. | 137/884 |
| 5,823,070 | 10/1998 | Taniguchi et al. | 74/606 R |
| 5,845,544 | 12/1998 | Huggins et al. | 74/606 R |

FOREIGN PATENT DOCUMENTS

| 93 07 228 | 8/1993 | Germany . |
|---|---|---|
| 43 34 595 C1 | 4/1995 | Germany . |

*Primary Examiner*—Vinh T. Luong
*Attorney, Agent, or Firm*—Herbert L. Lerner; Laurence A. Greenberg

[57] ABSTRACT

A controller for a motor vehicle with an automatic transmission is connected to sensors in the transmission and through a communications channel to an engine controller. A gear ratio is varied with actuators for actuating final control elements in the transmission. The transmission and the electronic transmission controller are constructed as an integrated complete system, which includes all of the mechanical, hydraulic and electronic transmission components. A plug forms a pressure and fluid-tight connection between the transmission and the transmission controller secured to a transmission housing.

2 Claims, 2 Drawing Sheets

CONTROLLER FOR A MOTOR VEHICLE WITH AN AUTOMATIC TRANSMISSION

CROSS-REFERENCE TO RELATED APPLICATION

This application is a continuation-in-part of U.S. application Ser. No. 08/700,687, filed Aug. 12, 1996 now abandoned.

BACKGROUND OF THE INVENTION

Field of the Invention

The invention relates to a controller for a motor vehicle with an automatic transmission, which is connected to sensors in the transmission, wherein a gear ratio is varied with actuators for actuating final control elements in the transmission; the transmission is constructed as an integrated complete system which includes all mechanical, hydraulic and electronic transmission components; and the control unit is provided with a plug that is connected to a printed circuit board on which electronic components of a transmission controller are mounted.

Such controllers are used in motor vehicles with automatic transmissions and include an electronic transmission controller which is connected to an engine controller through a communications channel or other communications path. The controller, or parts thereof, may also be combined with the transmission controller in a unit. The transmission controller evaluates information from the engine controller and signals from various sensors in the transmission, and optionally other sensors in the motor vehicle, and outputs control signals to actuators of the transmission, by which friction elements are actuated and thus switching operations are performed, or by which the gear ratio is varied, in the case of continuously variable transmissions.

In a known transmission control system, electrical, mechanical, hydraulic and electronic control devices are disposed inside the transmission housing. A printed circuit board, which is partly surrounded by oil, carries control electronics, according to German Utility Model DE 93 07 228.7 U1. Gaining access to the control system, for instance for repairs, requires opening or removing the entire transmission housing.

In a known controller for a motor vehicle, the transmission controller is secured to the transmission housing, the coils of the electrohydraulic pressure control valves are integrated with the transmission controller, and sensor signals are transmitted wirelessly to the transmission controller, according to German Patent DE 43 34 595 C.

SUMMARY OF THE INVENTION

It is accordingly an object of the invention to provide a controller for a motor vehicle with an automatic transmission, which overcomes the hereinafore-mentioned disadvantages of the heretofore-known devices of this general type, which reduces the expense for cables to connect the electronic controller to the transmission, which is easily dismantled and which forms a complete system with the automatic transmission, so that the complete system can then be tested, shipped and fully installed in the motor vehicle, all as a single component unit.

With the foregoing and other objects in view there is provided, in accordance with the invention, a control unit for a motor vehicle including an automatic transmission system which has a transmission housing, a printed circuit board, sensors, final control elements and actuators for actuating the final control elements to vary a gear ratio; a transmission controller is secured to the transmission housing and has electronic components mounted on the printed circuit board; a connection for a communications channel leading to an engine controller; a plug for pressure and fluid-tightly interconnecting the transmission and the transmission controller; and a counterpart connector element connecting the plug to the printed circuit board.

In accordance with a concomitant feature of the invention, there is a selector lever position sensor disposed inside of the transmission housing.

Other features which are considered as characteristic for the invention are set forth in the appended claims.

Although the invention is illustrated and described herein as embodied in a controller for a motor vehicle with an automatic transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
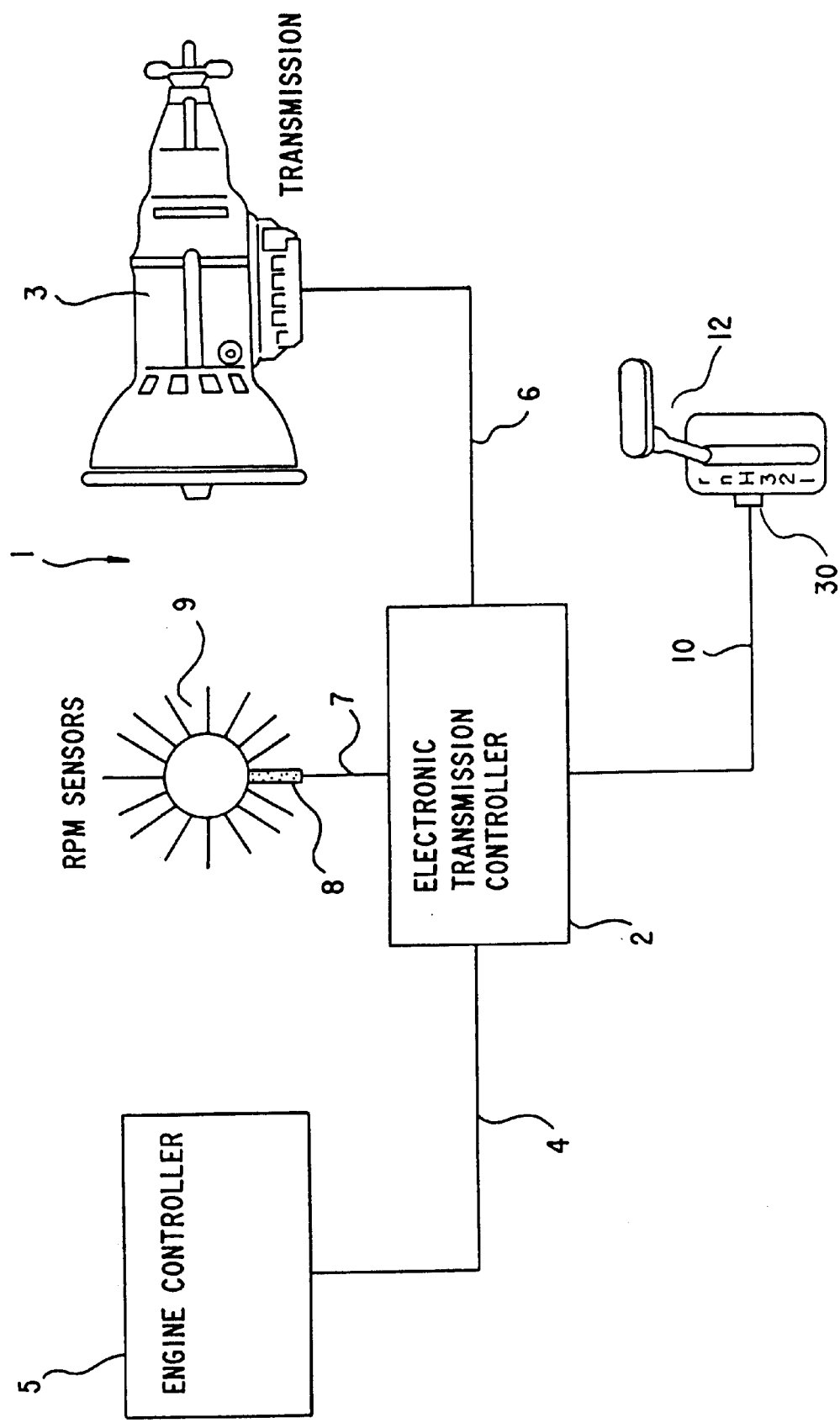
FIG. 1 is an overall schematic circuit diagram of components of a controller for a motor vehicle.
Figure 2:
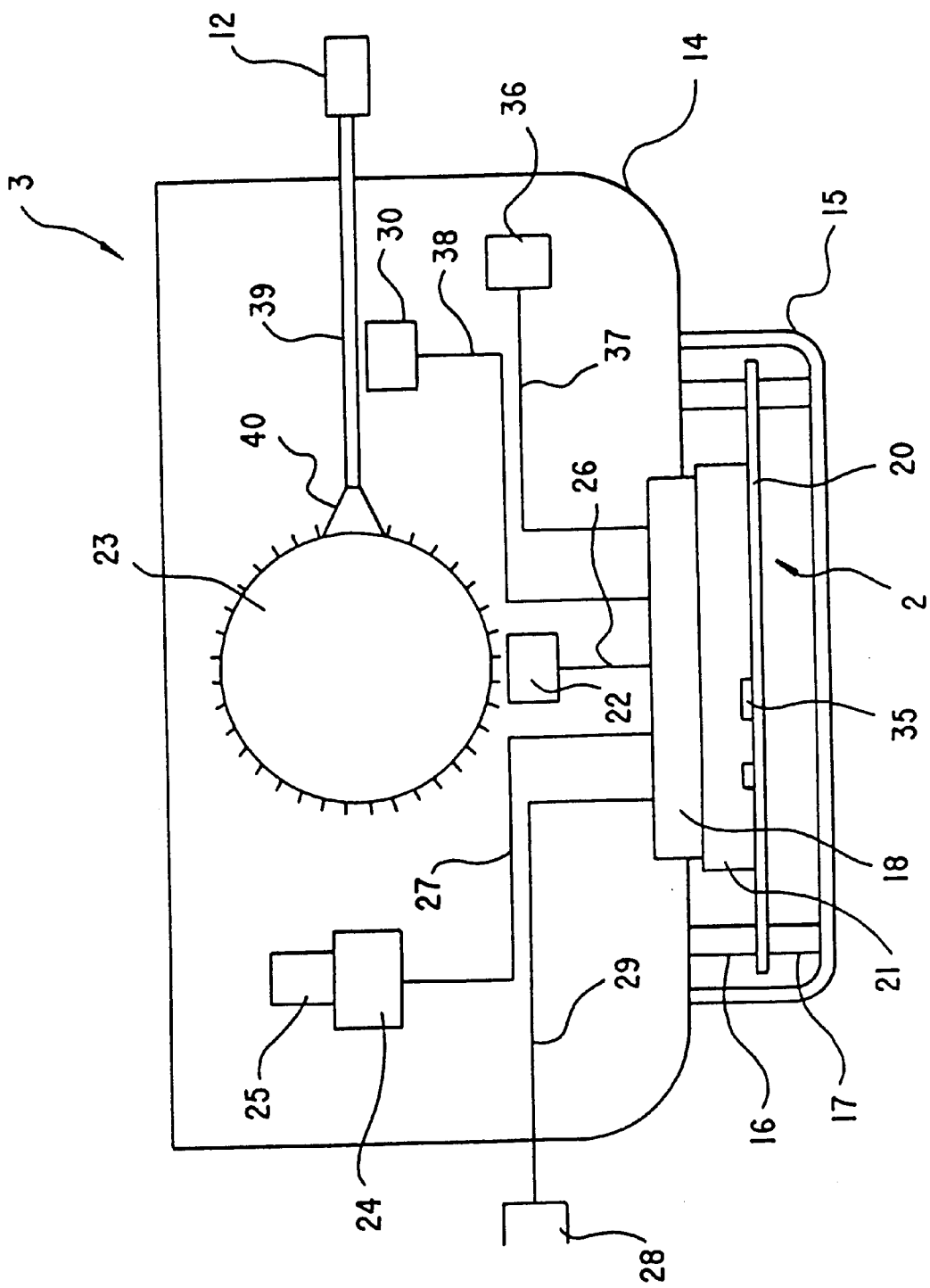
FIG. 2 is a diagrammatic, elevational view of an exemplary embodiment of the controller according to the invention.

Referring now to the figures of the drawings in detail and first, particularly, to FIG. 1 thereof, there is seen a controller 1 for a non-illustrated motor vehicle which has an electronic transmission controller 2 for an automatic transmission 3. The transmission controller 2 is connected through a communications channel 4 to an engine controller 5 and by signal and control lines 6 to the automatic transmission 3. The communications channel may be constructed as a cable harness or as a data bus, for example. In FIG. 1 the transmission controller 2 is shown to be separated from the transmission 3 for clarity purposes only. As shown in FIG. 2, the transmission controller 2 can be integrated with the transmission 3.

The transmission controller 2 is connected over a line 7 to an rpm sensor 8, which scans the revolutions of a toothed wheel 9 that is seated, for instance, on the crankshaft of a non-illustrated engine. The rpm sensor 8 is shown herein merely as an example of a plurality of rpm sensors which are present in the motor vehicle. The transmission controller 2 is finally connected, through a line 10, to a selector lever 12 for the automatic transmission 3. A selector lever position sensor 30 residing in or near the selector lever 12 housing, transmits a signal to the transmission controller 2 indicating the position of the selector lever 12 (i.e. park, reverse, drive, first gear, etc.).

The structural layout of the controller 1 of the invention will now be described, in conjunction with FIG. 2. An automatic transmission 3, which is not shown in FIG. 2 in detail, is accommodated in a transmission housing 14. A cap 15 is seated on this housing, joined rigidly to the housing by fastening elements 16, 17 and contains the electronic transmission controller 2. A plug 18 makes a pressure-tight and fluid-tight connection between the control unit 2 and the transmission housing 14 and thus with the transmission 3 contained therein. Electrical and electronic circuit components 35, which are not shown in detail herein, are mounted on a printed circuit board 20. The plug 18 is connected to the printed circuit board 20 through a counterpart connector element 21. The counterpart connector element 21 may (as shown) be soldered directly to the printed circuit board 20, or may be electrically connected to it through a short line. The printed circuit board 20 is secured either to the transmission housing 14 by the fastening elements 16 or to the cap 15 by the fastening elements 17.

Sensors and actuators which are present in the transmission 3 are connected to the side of the plug 18 facing toward the interior of the transmission 3. An rpm sensor 22, which faces a gear wheel 23, and an actuator or final control element 24 for a hydraulic valve 25, are shown in this case to stand for other sensors and actuators, and they are respectively connected to the plug 18 through a signal line 26 and a control line 27. A temperature sensor 36 is also connected to the transmission controller 2 by a line 37 for providing transmission temperature information to the transmission controller 2.

A further plug or connection 28, which is connected to the plug 18 by a line 29, connects the transmission controller 2 to other control units, such as the engine controller 5, to other sensors, such as the rpm sensor 8, and to a non-illustrated supply voltage source, in the motor vehicle.

A further reduction in the expense for cabling can be achieved by placing the selector lever position sensor 30 inside the transmission housing 14 instead of the selector lever 12 housing. In this embodiment, the selector lever position sensor 30 determines a position of the selector lever 12 from a position of a gear shift lever shaft 39 which is connected to a standby transmission controller 40. The selector lever position sensor 30 is connected to the transmission controller 2 by a line 38. The standby transmission controller 40 will only be activated by the gear shift lever shaft 39 if the electronic transmission controller 2 is failing. It is noted that the mechanical connection of the gear shift lever shaft 39 was omitted from FIG. 1 only for clarity purposes.

In summary, the controller 1 of the invention can be described as follows. The controller 1 for a motor vehicle with an automatic transmission 3 is connected to sensors 22, 36 in the transmission and, through a communications channel, to an engine controller 5. The gear ratio is varied with actuators 25 by which final control elements 24 in the transmission are actuated. The transmission 3 and the electronic transmission controller 2 are constructed as an integrated complete system, which includes all of the mechanical, hydraulic and electronic transmission components 3, 20, 22, 24, 25, 26 and 36. A plug 18 forms a pressure-tight and fluid-tight connection between the transmission 3 and the transmission controller 2 secured to the transmission housing 14.

We claim:

1. A control unit for a motor vehicle, comprising:

an automatic transmission system including a transmission housing, a printed circuit board, sensors, final control elements and actuators for actuating said final control elements to vary a gear ratio;

a transmission controller being secured to said transmission housing and having electronic components mounted on said printed circuit board;

a connection for a communication channel leading to an engine controller;

a plug for pressure and fluid-tightly interconnecting said transmission and said transmission controller; and a counterpart connector element connecting said plug to said printed circuit board.

2. The control unit according to claim 1, including a selector lever position sensor disposed inside of said transmission housing.

* * * * *